United States Patent Office 3,504,532
Patented Apr. 7, 1970

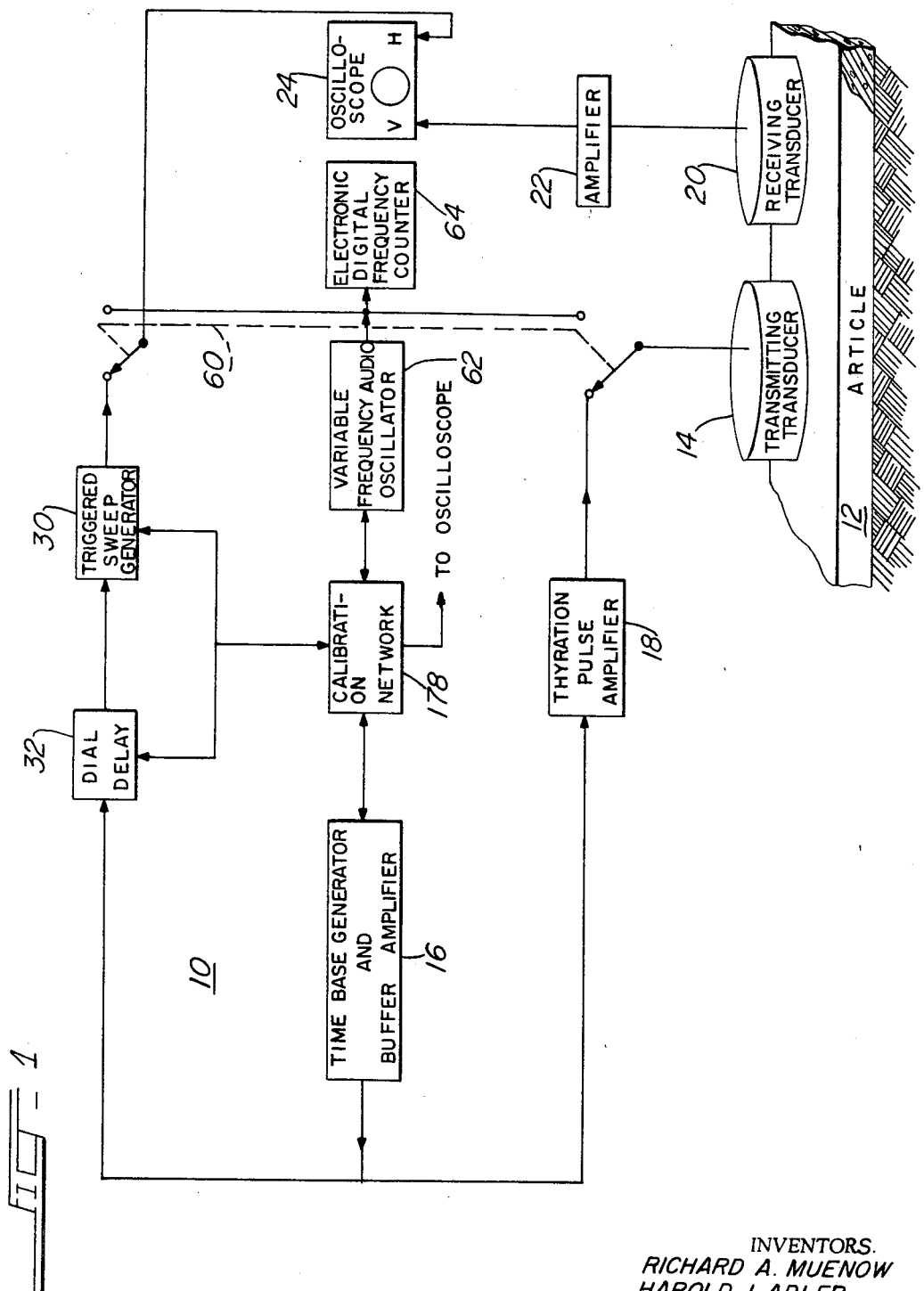

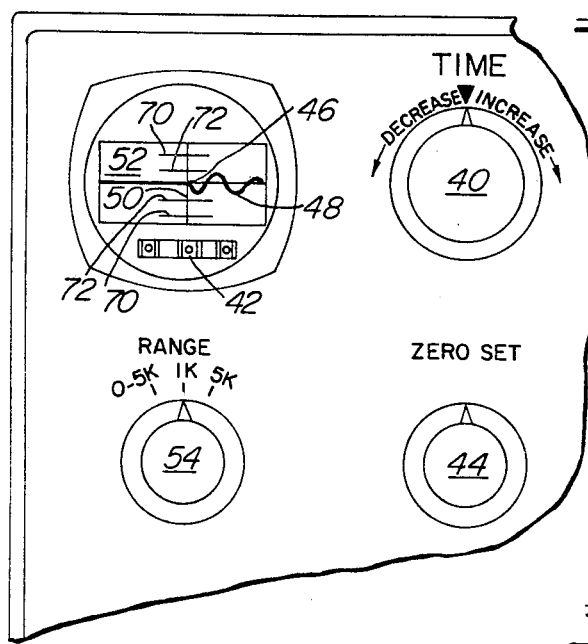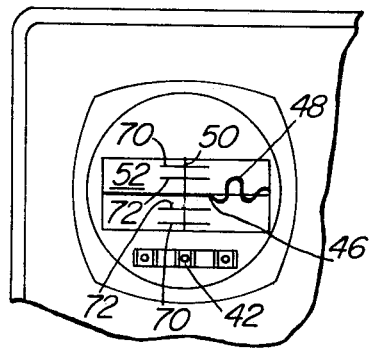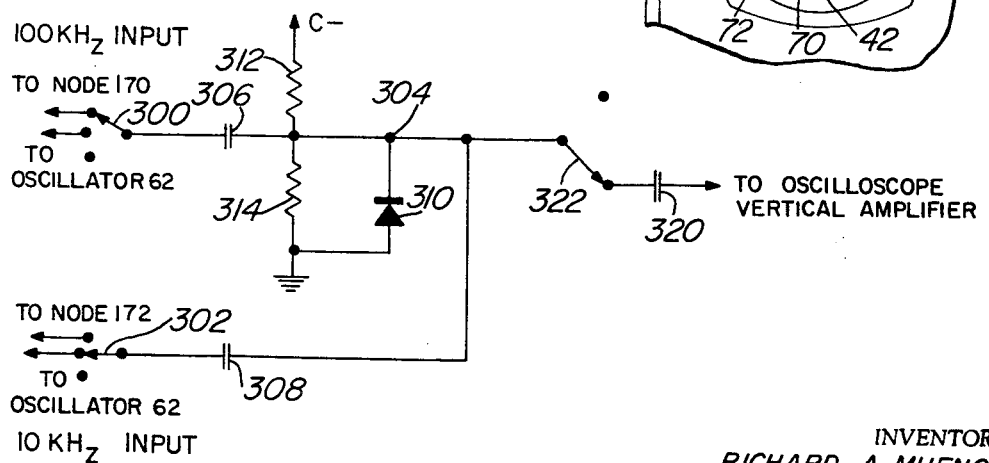

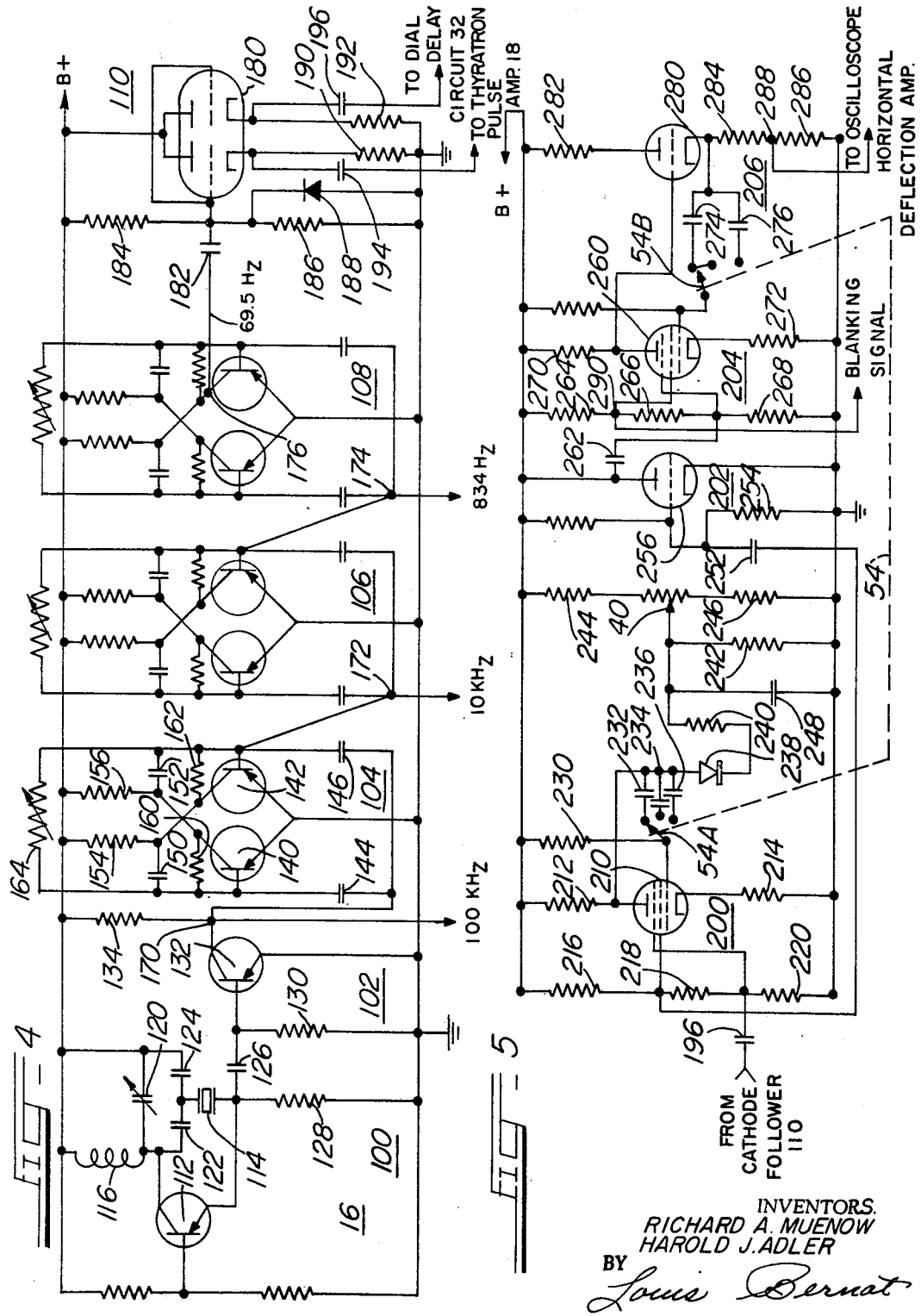

3,504,532
NONDESTRUCTIVE TESTING SYSTEM
Richard A. Muenow, Glenview, and Harold J. Adler, Skokie, Ill., assignors to James Electronics Inc., a corporation of Illinois
Filed Oct. 31, 1966, Ser. No. 590,703
Int. Cl. G01n 29/04
U.S. Cl. 73—67.7     8 Claims

ABSTRACT OF THE DISCLOSURE

The invention provides sonic energy transmitting and receiving transducers which are applied directly to an article under test. A delay circuit is adjusted until it produces a delay exactly equal to the time required for sound to travel from the transmitting transducer to the receiving transducer, that time being a function of the speed of sound in the article. Then, that delay is read out as an indication of the speed of sound in the article, and therefore the characteristics of the article. The delay may be read out on a digital meter or an oscilloscope.

---

This invention relates to means for testing materials and more particularly to a means for nondestructively testing the structural integrity of articles by measuring their sonic characteristics.

The nondestructive testing of materials by measurement of sonic characteristics is well known. In such examinations, the velocity at which sound is propagated through the article under test or the driving frequency at which the article attains mechanical resonance can be used as reliable indicators of the structural integrity of the article. Extremely small changes in either the chemical composition of the material from which the article is fabricated or the dimensions or homogenity of the article cause measurable changes in either the velocity of sound and resonant frequency measurements. With proper correlation, the measured changes can identify a deviation from the standard density, alloy composition and mix proportion as well as casting changes, most discontinuities and fatigue.

While a number of instruments have been developed which are capable of determining one of the measurable sonic qualities, i.e., either the velocity of propagation, the frequency of mechanical resonance or the magnitude of sonic energy absorption; no prior art device exists which is capable of measuring all of the sonic characteristics of an article.

Accordingly, it is a principal object of this invention to provide an instrument for measuring all of the sonic characteristics of an article whose structural integrity is to be tested.

This and other objects, features and advantages of this invention will be more fully described in the following description in which:

FIGURE 1 is a block diagram of the electronic circuitry of a preferred structural embodiment of the invention;

FIGURE 2 is a view of the instrument panel showing the control settings and the oscillogram of a calibrated instrument;

FIGURE 3 is a view of the instrument panel showing the oscillogram which is obtained when the transmitting and receiving transducers are placed on an article, before the time control is adjusted;

FIGURE 4 is a schematic diagram of the circuit of the time base generator;

FIGURE 5 is a schematic diagram of the dial delay and triggered sweep circuit; and FIGURE 6 is a schematic diagram of the mixer circuit of the calibration network.

FIGURE 1 is a block diagram which illustrates the basic interconnections between the major elements of a nondestructive testing system 10 which is capable of measuring the velocity of sound, the resonant frequency and the magnitude of sonic energy absorption of an article 12 such as a concrete highway slab.

The method of measuring the propogation velocity comprises the steps of transmitting a mechanical pulse through the article 12 and determining the time required for the pulse to travel a known distance.

The pulses are transmitted to the article 12 by an electromechanical sonic energy converting transducer 14 which, in the preferred embodiment, contains a piezoelectric crystal transducing element. The electrical pulses for driving the transmitting transducer 14 are generated by a time base generator and buffer amplifier 16 which serves as the time standard of the system 10. The signals from the time base generator 16 amplified to a power level sufficient for driving the transducer 14 by a thyratron pulse amplifier 18.

The transmitted mechanical pulse is received by a second electromechanical sonic energy converting transducer 20 which may also contain a piezoelectric crystal transducing element. The receiving transducer 20 is spaced from the transmitting transducer 14 by a known distance; thereby enabling the velocity of sound propogation to be calculated quickly by dividing the known distance by the propogation time required for the pulse to travel from transducer 14 to transducer 20.

The electrical signals generated by the receiving transducer 20 are amplified by an amplifier 22 and applied to the vertical deflection circuits of a cathode ray oscilloscope 24.

A synchronized and calibrated sweep signal is applied to the horizontal deflection circuit of the oscilloscope 24 for the purpose of providing, with the vertical deflection signal, a visual display on the oscilloscope screen of the relative time relationship between the transmitted and received pulses. The sweep signal is generated by a triggered sweep generator 30 which produces a sawtooth wave of calibrated rise time. The triggered sweep generates one sweep cycle each time a synchronizing signal is applied to its input. The synchronizing signal is taken from the time base generator and buffer amplifier 16 and applied to the input of a dial delay circuit 32 where a known, variable delay time chosen by the operator is introduced.

The system is operated in the following manner to determine sonic velocity. First, the system is calibrated to obtain the oscillogram and the time control setting shown in FIGURE 2. Calibration is achieved by the process of placing the transducers 14 and 20 face-to-face so that a mechanical pulse is transmitted directly from the transducer 14 to the transducer 20, turning time control 40 of the dial delay circuit 32 until the digital register 42 indicates zero, and adjusting the zero set time lag control 44 of the thyratron pulse amplifier 18 until the leading edge 46 of the received signal oscillogram 48 intersects coordinate line 50 on the face 52 of the oscilloscope 24. By calibrating the instrument in this manner, the effects of delays introduced by the transducers, their cables and other elements are eliminated.

The system now may be used to measure sonic velocity by placing the transducers 14 and 20 on the article 12 at points which are separated by a known distance. Pulses are applied to the article 12 by transducer 14 and received by transducer 20. The received signal is displayed on the face 52 of the oscilloscope screen and appears as shown in FIGURE 3, with the leading edge 46 of the oscillogram 48 displaced from the coordinate line 50. The propogation time of the signal through article 12 is determined by turning the time control 40 until the leading edge 46 of the oscillogram 48 again intercepts the coordinate line 50 as shown in FIGURE 2. The digital register 42 which is driven by the time control 40 now indicates the three most significant digits of the number which when multiplied by the value indicated by range selector 54 equals the propogation time of sound over a measured path through the article. By dividing the propogation time into the length of the measured distance, the propogation velocity can be calculated.

The method of measuring the frequency of mechanical resonance of the article 12 comprises the steps of applying mechanical vibrations of known frequency to the article and changing the frequency until a received signal is obtained which lags the transmitted signal by 90°.

The mechanical vibrations are transmitted to the article 12 by the transmitting transducer 14 and the article's response to excitation is sensed by the receiving transducer 20. The positions of the transmitting and receiving transducers 14 and 20 on the article are determined by the type of resonance desired. Where the frequency of flexural resonance is desired, the transmitting transducer 14 is placed on the center of the article's top surface and the receiving transducer 20 is placed at one end of the top surface. The article is supported only along lines located from each end by a distance equal to 0.22 times the length of the article. The frequency of torsional resonance is determined by supporting the article along a line passing through its center and placing the transmitting transducer 14 and the receiving transducer 20 at opposite ends of a side which is bisected by the support. Longitudinal resonance is determined by supporting the article along a line passing through its center and by placing transducers 14 and 20 on opposite ends so that a line passing between the two transducers is approximately perpendicular to the line of support. Where the article cannot be supported, as is the case with a concrete highway slab, longitudinal resonance can be determined by placing the transducers 14 and 20 on the top surface as shown in FIGURE 1.

To operate the system as a resonant frequency meter, DPDT switch 60 is switched from the position shown in FIGURE 1 to its other position. The transmitting transducer 14 is now connected to a variable frequency audio oscillator 62. Similarly, the input terminal of the oscilloscope 24 horizontal amplifier is disconnected from the output of the triggered sweep circuit 30 and connected to the output of the variable frequency audio oscillator 62. The audio oscillator 62 output is also connected to a precision, electronic digital frequency counter 64 which displays the oscillator's output frequency. The receiving transducer 20 remains connected to the vertical amplifier of the oscilloscope 24 through amplifier 22.

To determine the resonant frequency of the article 12, the transducers 14 and 20 are placed on the article at one of the positions previously described and the output frequency of the variable frequency audio oscillator is adjusted within the range between 20 Hz. and 100 KHz. until a circular Lissajou pattern appears on the screen 52 of the oscilloscope 24. The resonant frequency is then read from the digital frequency counter 64.

Having determined the resonant frequency of the article, the "Q" (a relative index of the resonance characteristics) of the material may be calculated. The procedure comprises changing the frequency of the variable frequency audio oscillator 62 slightly from the resonant frequency until the two "half power" frequencies, one above and the other below the resonant frequency, are found at which the amplitude of the receiving transducer 20 signal is 0.707 the amplitude of the received signal at resonance and computing "Q" by dividing the resonant frequency by the difference of the "half power" frequencies.

The oscilloscope screen 52 contains lines 70 and 72 which aid in the determination of the "half power" frequencies. After a circular Lissajou pattern has been obtained and the resonant frequency noted, the horizontal signal to the oscilloscope 24 is disconnected by a switch (not shown) so that only a vertical trace remains on the screen 52. The oscilloscope amplifier controls (not shown) are adjusted until the ends of the vertical trace terminate at the lines 70. The frequency of oscillator 62 is changed, as described above, until the two "half power" frequencies at which the trace terminates at lines 72, which are separated by 0.7707 of the distance that separates lines 70, are determined.

The data on the longitudinal propogation velocity and the frequency of longitudinal resonance can be used to determine the thickness of articles which cannot be measured without damage in any other way. An example of a particularly useful application for this system is in the measurement of the thickness of concrete highway slabs which heretofore have been measured by taking core samples. It has been found that the thickness of a concrete slab $$T = V/2F$$

where:

$V$ = longitudinal propogation velocity, and
$F$ = frequency at longitudinal resonance.

Tests have shown that this method of calculating thickness provides data which are within 5% of the true measured values under almost all conditions.

The accuracy of the measurements obtained with the system 10 is directly related to the quality of the signals generated in the system. The variable frequency audio oscillator 62 may be of conventional design and requires no description; however, because of their novelty and importance in a nondestructive testing system the time base generator and buffer circuit 16, the dial delay circuit 32, and a portion of calibration network 178 will be described in detail.

The schematic diagram of the time base generator and buffer amplifier circuit is shown in FIGURE 4. This circuit 16 comprises a 100 kHz. oscillator 100, an oscillator buffer 102, frequency dividers 104, 106 and 108 and a cathode follower buffer 110.

The 100 kHz. oscillator 100 contains a transistor 112 as the active oscillating element. A 100 kHz. series mode crystal 114 serves as the primary frequency standard. Inductor 116 and capacitors 120, 122 and 124 form the collector tank circuit. The 100 kHz. output signal of the oscillator appears across the emitter of transistor 112 and ground and is coupled by a filter consisting of a capacitor 126, and resistors 128 and 130 to the base of transistor 132, which serves as the active element of the common emitter buffer amplifier 102.

The output signal of the buffer amplifier 102 appears across collector load resistor resistor 134 and is D.C. coupled to the frequency divider 104 which is a double synchronized, free running multivibrator. The free running frequency of the frequency divider 104 is 10 kHz. or $\frac{1}{10}$ of the frequency of the oscillator 100. The frequency divider contains transistors 140 and 142 in a common emitter, flip-flop configuration. The synchronizing signals from the buffer amplifier 102 are applied to the base electrodes of both transistors 140 and 142 through capacitors 144 and 146. The main fixed value, frequency determining elements of the frequency divider are the capacitors 150 and 152 and the resistors 154 and 156. Resistors 160 and 162 provide proper biasing.

A rheostat 164, connected between the base electrodes of the transistors 140 and 142, is used to adjust the final operating frequency of the frequency divider 104. Because the stage is double synchronized, the 100 kHz. input signal will be divided by an even rather than an odd number. This feature eliminates the possibility of the frequency divider changing its division mode so that it divides by 9 or 11 instead of by 10. The use of the rheostat 164 as the tuning element provides a novel and convenient means for tuning the frequency divider to the proper division mode.

Frequency dividers 106 and 108 have the same network topology as that which has been described for frequency divider 104. The values of their elements are different because they operate at different frequencies. The frequency divider 106, which divides the output signal of frequency divider 104 by 12, operates at 834 Hz. and the frequency divider 108, which divides the output signal of the frequency divider 106 by 12, oscillates at 69.5 Hz.

For callibration purposes, the 100 kHz. signal at node 170, the 10 kHz. signal at node 172, the 834 Hz. signal at node 174 and the 69.5 Hz. signal at node 176 are transmitted to calibration network 178 (FIG. 1). By means of switching facilities which need not be described, each of these signals can be compared with a signal of the same frequency which is generated by the variable frequency audio oscillator 62 by generating Lissajou patterns with the oscilloscope 24. By referencing the signals from the time base generator and buffer amplifier 16 and the oscillator 62 against each other and against the dial delay signals, instrument calibration can be readily checked. The effects of drift are minimized because, as each of the elements of the system is compensated for drift in the same direction, incremental errors of approximately equal magnitude are divided into each other and cancelled. This feature is not present when individual components are used to measure each of the different sonic parameters.

The output signals from the time base generator and buffer amplifier 16 are taken from the cathode follower buffer stage 110. This stage comprises a dual triode 180 connected in a dual cathode follower configuration. The plates of dual triode 180 are connected to a B+ power supply line. The grids are capacitor coupled to node 176 by capacitor 182. Resistors 184, and 186 and diode 188 provide proper grid bias. Cathode resistors 190 and 192 return the individual cathodes to ground. Coupling capacitors 194 and 196 serve to couple the buffer amplifier 110 to the dial delay circuit 32 and to the thyratron pulse amplifier 18.

A schematic diagram of the dial delay and triggered sweep circuit is shown in FIGURE 5. The circuit comprises a cathode coupled phantastron 200, a buffer amplifier 202, a Miller sweep circuit 204 and a clamping amplifier 206.

The phantastron comprises a pentode 210, plate load resistor 212, cathode resistor 214, bias resistors 216, 218 and 220 and a timing circuit containing resistor 230, capacitors 232, 234, and 236, diode 238, resistors 240, 242, 244 and 246, capacitor 248, the time control potentiometer 40 and the single pole, triple throw range selector switch 54A.

The input signal from the cathode follower stage 110 is coupled to the suppressor grid of the pentode 210 by the capacitor 196. Resistors 214, 216, 218 and 220 provide the proper biasing potentials and feedback for the grids and the cathode of the pentode 210. The setting of the switch 54A and the timing control potentiometer 40 determine the time constant and the plate rundown voltage for the phantastron. The range selector switch 54A is used to select one of the capacitors 232, 234, or 236 which determines the range of the delay times which can be obtained by varying the time control potentiometer 40.

The phantastron 200 is operated in the following manner. A positive pulse applied to the suppressor grid of the pentode 210 causes the tube to switch to its high conduction state. The plate voltage linearly decreases with time until it reaches a low value at which time the tube switches to its low conduction state and the plate voltage increases rapidly to the potential appearing at the wiper of the time control potentiometer 40. As the plate voltage decreases linearly with respect to time to its low switching voltage, it is clear that the time tube 210 is in its high conduction state is a function of the setting of control 40.

As soon as the postive pulse is applied to the suppressor grid of the pentrode 210, a positive voltage step appears on the screen grid. This step remains throughout the time tube 210 is in its high conduction state. When the tube returns to its low conduction state, a negative voltage step cancels the positive voltage step appearing on the screen grid. Thus, the oscillogram of the voltage appearing at the screen grid of the pentode 210 is a square pulse whose leading edge occurs when the pentode 210 switches to its high conduction state and whose trailing edge occurs when the pentode switches to its low conduction state.

The square pulse is differentiated by the filter comprising capacitor 252 and resistor 254. A positive impulse followed by a negative impulse are applied to the grid of triode 256 which serves as the active element of buffer amplifier 202. The negative impulse generates a positive pulse at the plate of triode 256. This pulse is transmitted through the capacitor 262 to the suppressor grid of the pentode 260 in the Miller sweep circuit 204.

The Miller sweep circuit contains, in addition to the pentode 260, bias resistors 264, 266, and 268, plate load resistor 270, cathode resistor 272 and the sweep timing circuit which comprises capacitors 274 and 276, triple throw, single pole switch 54B ganged to switch 54A, and the clamping amplifier 206 containing triode 280 and resistors 282, 284 and 286.

The Miller sweep circuit operates in much the same manner that the phantastron circuit 200 operates. A positive pulse applied to the suppressor grid of pentrode 260 cause the tube to switch into its high conduction state. In this state, the plate potential decreases linearly with time at a rate which is determined by the switching of either capacitor 274 or capacitor 276 into the circuit by range selector switch section 54B. The sawtooth output signal appearing at the plate of the pentode 260 is applied to the grid of the triode 280 of the clamping amplifier 206. The clamping amplifier reduces the recovery time of the Miller sweep circuit at the end of each cycle and acts as a cathode follower buffer. The output signal which is fed to the oscilloscope 24 horizontal deflection amplifier is taken from node 288 at the junction of the cathode bias resistors 284 and 286.

The cathode ray tube blanking signal is developed at the screen grid of the pentode 260, specifically at node 290. As with the phantastron 200, the screen grid of the Miller sweep circuit develops a positive square voltage pulse when the pentode 260 is in the high conduction state. This signal is used to turn on the cathode ray beam during the period of forward sweep.

The dial delay and triggered sweep circuits of FIGURE 5 are calibrated by applying reference signals from the time base generator and buffer amplifier 16 or the variable frequency audio oscillator 62 to the vertical deflection amplifier of the oscilloscope and noting horizontal distances swept by the trace between reference markers on the face of the oscilloscope.

A schematic of the mixing circuit in the calibration network 178 used for calibrating the dial delay and triggered sweep circuits is shown in FIGURE 6. A 100 kHz. signal from either the variable frequency audio oscillator 62 or from node 170 of the time base generator 16 is selected by switch 300. Similarly, a 10 kHz. signal from either the oscillator or the node 172 of the time base generator is selected by switch 302. The 100 kHz. and the 10 kHz. calibration signals are coupled to node 304 by isolating capacitors 306 and 308. Clamp diode 310 is connected between node 304 and ground. The diode is forward-biased by a low voltage negative power supply and voltage dividing resistors 312 and 314 so that the diode is normally conducting and effectively short circuits node 304 to ground. When the 100 kHz. and 10 kHz. signals are applied to the calibration circuits, the diode becomes back-biased only when the positive potentials of the calibration signals exceed the negative bias potential appearing at node 304. When this occurs, the voltage at node 304 rise above ground potential and the upper positive portions of the 100 kHz. and 10 kHz. signals are transmitted to the oscilloscope 24 vertical deflection amplifier through capacitor 320 when switch 322 is closed. The 100 kHz. and 10 kHz. marker pulses then appear on the oscilloscope screen for calibration purposes. As signals from both the time base generator 16 and the variable frequency audio oscillator 62 can be used for calibration simultaneously, each of the time dependent elements can be cross checked with any of the other to minimize measurement errors as described above.

In addition to being used for detecting irregularities, such as decay, discontinuities, fatigue, changes in composition and the thickness of an article, the system of this invention can be used to determine Young's modulus, the shear modulus and Poisson's ratio. The processes for computing these data from information on the sonic characteristics of the article under examination are taught in the prior art.

What is claimed is:
1. A nondestructive testing system comprising:
   (a) a transmitting electrochemical sonic energy converting transducer;
   (b) a receiving electromechanical sonic energy converting transducer;
   (c) means for generating periodic pulses to control the transmission of said sonic energy;
   (d) means for generating a synchronized sweep signal;
   (e) means for transmitting, with a known controllable amount of delay, pulses from the pulse generating means to the sweep signal generating means;
   (f) a variable frequency audio oscillator;
   (g) means for displaying the frequency of the output signal of the audio oscillator;
   (h) means for visually displaying electric signals on a surface having two coordinate axes, including a first electric signal input associated with one axis and a second electric signal input associated with another axis;
   (i) means for connecting the receiving transducer to the first electric signal input of the visual display means;
   (j) first switching means for connecting the transmitting transducer either to the periodic pulse generating means or to the variable frequency audio oscillator; and
   (k) second switching means for connecting the second electric signal input of the visual display means either to the synchronized sweep signal generating means or to the variable frequency audio oscillator.

2. The nondestructive testing system of claim 1 wherein said means for generating periodic pulses comprises a plurality of output nodes wherein periodic signals having different periodicities appear, and means for comparing the periodicities of two periodic signals appearing at different ones of said nodes in the system.

3. The nondestructive testing system of claim 2 wherein the comparing means comprises:
   (a) first means for selecting one signal to be compared;
   (b) second means for selecting another signal to be compared;
   (c) means at a common node for mixing the signals selected by said first and second means;
   (d) means for suppressing all of the selected signals except for small pulse portions; and
   (e) means for transmitting the small pulse portions of the selected signals to the first electric signal input of the visual display means.

4. The nondestructive testing system of claim 1 wherein the means for generating periodic pulses comprises:
   (a) a frequency standard oscillator; and
   (b) a frequency divider coupled to the output of said oscillator.

5. The nondestructive testing system of claim 4 wherein the frequency standard oscillator comprises:
   a piezoelectric crystal controlled oscillator.

6. The nondestructive testing system of claim 4 in which the frequency divider comprises:
   (a) a first amplifying element having a pair of current carrying electrodes and a control electrode;
   (b) a second amplifying element having a pair of current carrying electrodes and a control electrode;
   (c) means for connecting the current carrying electrodes of each amplifying element in series with a source of electric current;
   (d) means for connecting one current carrying electrode of each amplifying element to the control electrode of the other amplifying element;
   (e) means for applying signal pulses to both control electrodes simultaneously; and
   (f) a variable resistance element in circuit with both control electrodes for adjusting the division mode of the frequency dividers.

7. The nondestructive testing system of claim 1 wherein the means for transmitting pulses with a known controllable amount of delay comprise:
   a phantastron circuit containing means for changing the time constant of the phantastron plate load circuit;
and the means for generating a synchronized sweep signal comprise:
   a Miller sweep circuit containing means for changing the sweep speed of the output signal in response to a change in the time constant of the phantastron plate load circuit.

8. The nondestructive testing system of claim 7 wherein the means for changing the time constant of the phantastron plate load circuit comprise:
   means for switching different combinations of capacitors into the phantastron plate load circuit.

References Cited

UNITED STATES PATENTS

| | | | |
|---|---|---|---|
| 2,825,813 | 3/1958 | Sperling | 250—36 |
| 2,950,445 | 8/1960 | Smith et al. | 331—37 |
| 3,096,489 | 7/1963 | Santos | 331—51 |
| 3,115,771 | 12/1963 | Henry | 73—67.9 |
| 3,144,584 | 8/1964 | La Finadra et al. | 315—241 |
| 3,144,764 | 8/1964 | Harmon | 73—67.8 |
| 3,178,658 | 4/1965 | Henrion | 332—14 |
| 3,210,691 | 10/1965 | Sprott | 331—113 |
| 3,243,567 | 3/1966 | Lobur | 219—69 |
| 3,243,714 | 3/1966 | Hekimian | 328—248 |

OTHER REFERENCES

Nondestructive Testing Handbook, vol. II edited by McMaster, published by The Ronald Press Co., 1959, pages of interest 51.6 to 51.9.

Ultrasonic Technology, by Goldman, published by Reinhold Publishing Corp., 1962, p. 241.

Electronic Line Measurement, p. 121.

CHARLES A. RUEHL, Primary Examiner